United States Patent
Conwell

(10) Patent No.: US 7,657,064 B1
(45) Date of Patent: Feb. 2, 2010

(54) METHODS OF PROCESSING TEXT FOUND IN IMAGES

(75) Inventor: William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1642 days.

(21) Appl. No.: 09/670,113

(22) Filed: Sep. 26, 2000

(51) Int. Cl.
*G06K 9/00* (2006.01)

(52) U.S. Cl. ............... 382/105; 382/100; 382/176; 382/321

(58) Field of Classification Search .......... 707/101; 382/100, 105, 321, 176; 358/462, 321
See application file for complete search history.

(56) References Cited

U.S. PATENT DOCUMENTS

| | | | | |
|---|---|---|---|---|
| 4,908,873 | A * | 3/1990 | Philibert et al. | 382/100 |
| 5,257,119 | A | 10/1993 | Funada et al. | |
| 5,506,697 | A * | 4/1996 | Li et al. | 358/448 |
| 5,678,155 | A | 10/1997 | Miyaza | |
| 5,729,471 | A | 3/1998 | Jain et al. | |
| 5,761,686 | A * | 6/1998 | Bloomberg | 715/529 |
| 5,765,176 | A | 6/1998 | Bloomberg | |
| 5,841,886 | A * | 11/1998 | Rhoads | 382/115 |
| 5,978,477 | A | 11/1999 | Hull et al. | |
| 5,995,978 | A | 11/1999 | Cullen et al. | |
| 6,024,287 | A | 2/2000 | Takai et al. | 235/493 |
| 6,067,553 | A * | 5/2000 | Downs et al. | 715/523 |
| 6,101,274 | A | 8/2000 | Pizano et al. | 382/176 |
| 6,182,090 | B1 | 1/2001 | Peairs | |
| 6,192,138 | B1 * | 2/2001 | Yamadaji | 382/100 |
| 6,243,480 | B1 | 6/2001 | Zhao et al. | 382/100 |
| 6,243,481 | B1 * | 6/2001 | Tao | 382/100 |
| 6,286,036 | B1 | 9/2001 | Rhoads | 709/217 |
| 6,311,214 | B1 | 10/2001 | Rhoads | 709/217 |
| 6,321,981 | B1 * | 11/2001 | Ray et al. | 235/380 |
| 6,325,420 | B1 | 12/2001 | Zhang et al. | |
| 6,334,721 | B1 | 1/2002 | Horigane | |
| 6,351,815 | B1 | 2/2002 | Adams | |

(Continued)

FOREIGN PATENT DOCUMENTS

EP    493091    7/1992

(Continued)

OTHER PUBLICATIONS

Zhao, "A. WWW Service to Embed and Prove Digital Copyright Watermarks," Fraunhofer Institute for Computer Graphics, Proc. of EU Conf. on Multimedia Applications, Services and Techniques, May 1996, 15 pages.*

(Continued)

*Primary Examiner*—Wesley Tucker

(57) ABSTRACT

An image containing text (e.g., a surveillance camera photo that includes a vehicle license plate) is analyzed to determine the text (e.g., by an OCR technique). The recognized text is then stored in a database. The image is digitally watermarked with an identifier that associates the image with the database location where the text is stored. In addition to surveillance contexts, this technology can be employed in indexing the World Wide Web. Images used in web pages can be watermarked to link to associated text or other data. When the web page is crawled by an indexer, the watermark can be decoded and the associated data repository accessed to obtain information that can augment the web index for that page.

5 Claims, 1 Drawing Sheet

U.S. PATENT DOCUMENTS

| | | | |
|---|---|---|---|
| 6,370,258 B1 | 4/2002 | Uchida | |
| 6,373,960 B1 * | 4/2002 | Conover et al. | 382/100 |
| 6,389,151 B1 * | 5/2002 | Carr et al. | 382/100 |
| 6,484,933 B1 | 11/2002 | Zimmerman et al. | |
| 6,553,129 B1 | 4/2003 | Rhoads | 382/100 |
| 6,553,131 B1 | 4/2003 | Neubauer et al. | 382/105 |
| 6,577,746 B1 | 6/2003 | Evans et al. | 382/100 |
| 6,587,586 B1 | 7/2003 | Cui et al. | 382/176 |
| 6,590,997 B2 | 7/2003 | Rhoads | 382/100 |
| 6,608,930 B1 | 8/2003 | Agnihotri et al. | |
| 6,614,914 B1 | 9/2003 | Rhoads et al. | 382/100 |
| 6,614,915 B2 | 9/2003 | Powell et al. | 382/100 |
| 6,647,128 B1 | 11/2003 | Rhoads | 382/100 |
| 6,747,687 B1 * | 6/2004 | Alves | 348/148 |
| 6,799,302 B1 * | 9/2004 | Sites | 715/526 |
| 6,801,999 B1 * | 10/2004 | Venkatesan et al. | 713/167 |
| 2002/0027994 A1 | 3/2002 | Katayama et al. | |
| 2002/0046171 A1 | 4/2002 | Hoshino | |
| 2004/0015362 A1 | 1/2004 | Rhoads | |

FOREIGN PATENT DOCUMENTS

| | | |
|---|---|---|
| JP | 08-50598 | 2/1996 |
| WO | WO0211446 | 2/2002 |

OTHER PUBLICATIONS

Lopresti et al., "Locating and Recognizing Text in WWW Image", Dec. 30, 1999, Information Retrieval, col. 2, No. 2-3, pp. 177-206.*

Swain Michael, "Searching for Multimedia on the World Wide Web," 1999, IEEE, pp. 32-37.*

Shim et al., "Automatic Text Extraction from Video for Content-Based Annotation and Retrieval," Pattern recognition, IEEE, Aug. 16-20, 1998, pp. 618-620.*

U.S. Appl. No. 09/522,678, filed Mar. 10, 2000, Levy.

Johnson, et al., "Bridging the Paper and Electronic Worlds: The Paper User Interface", Interchi '93, pp. 507.

Newman, William, et al. A Desk Supporting Computer.

Whittaker, et al., "Back to the Future: Pen and Paper Technology Supports Complex Group Coordination," CHI '95, Conference on Human Factors in Computing Systems, Denver, Colorado (May 7.

Peairs, "Iconic Paper," Proceedings of the Third International Conference on Document Analysis and Recognition (ICDAR '95), pp. 1174.

Bloomberg, "Embedding Digital Data on Paper in Iconic Text" SPIE vol. 3027, Document Recognition IV, pp. 67-80 (1997).

Newman, William, et al. A Desk Supporting Computer, May 7, 1992.

* cited by examiner

METHODS OF PROCESSING TEXT FOUND IN IMAGES

The World Wide Web is a distributed database including hundreds of millions of documents. Search engines such as Alta Vista attempt to index the web based on ASCII text included on each page and on associated meta tags. Increasingly, however, text information is present on the Web in the form of text images. Known search engines are unable to make use of text presented in this form.

One approach to this problem is discussed in Lopresti et al, "Locating and Recognizing Text in WWW Images," Information Retrieval, vol. 2, no. 2-3 p. 177-206, 2000, and involves a procedure based on clustering in color space followed by a connected-components analysis. Character recognition is performed using polynomial surface fitting and "fuzzy" n-tuple classifiers. While suitable for some applications, such techniques are too computationally intensive and imprecise for widespread use.

In accordance with one embodiment of the present invention, an image containing text is digitally watermarked with an identifier. The identifier serves as an index to a database record where additional information about the image, including keywords or full text of the included text, are provided. To obtain the associated data, a search engine web crawler or other process can download an image, apply a watermarking detection procedure, use an identifier thereby obtained to index a database, and access keywords or full text represented in the image from the indexed database record.

The text can be entered in the database using various known methods. One is to have the text manually coded by a clerical service. Another is to apply an automated OCR process to the image data, such as that detailed by Lopresti. Once the text is once thereby developed, it can be made quickly available repeatedly thereafter by reference to the associated database record.

The database can be conventional, and is preferably accessible over the internet. A suitable database system is disclosed in copending application Ser. No. 09/571,422, filed May 15, 2000. A variety of watermarking techniques are known. An illustrative set of techniques that can be employed in this application is disclosed in copending application Ser. No. 09/503,881, filed Feb. 14, 2000 (now U.S. Pat. No. 6,614,914). The disclosures of these applications are incorporated herein by reference.

The technology disclosed herein finds myriad applications. As noted, one is in the indexing of a collection of electronic documents (e.g., web pages). An index augmented by the results of such a procedure is generally more useful than such an index without augmentation.

Another application is in the use of webcams, or security monitoring cameras. Certain image frames from such sources (e.g., one every minute, or one every second, etc.) can be analyzed for textual information (e.g., license plate markings, superimposed date data), and the textual information stored. The image data is watermarked, with the watermark indicating the repository of the corresponding textual information.

Still another application is PDF documents or fax data files. (While some PDF files include corresponding ASCII text data, most do not.) The file data can be applied to an OCR engine, and the resulting text stored in a database. The PDF or fax data file can be slightly altered to impart a watermark—the watermark again serving to point to the repository of the corresponding text information.

Yet another application is in photocopiers. Again, the textual content is extracted from the scanned image of the original document. In this case the paper photocopy output (or a corresponding digital file) is altered in slight respects to encode a watermark. The watermark points to the text data repository.

While the illustrative embodiment particularly considered watermarks that convey an index to a remote database, other arrangements are naturally possible. For example, the watermark can directly encode the fulltext or keywords (forms of metadata).

Similarly, while the illustrative embodiment particularly considered imaged text in image files, the same principles can be applied more widely. For example, all metadata associated with an image through a watermark can be employed in compiling an index of the web or other collection of content data—not just included text (e.g., names of persons and places, dates, times, and other more application-specific metadata). Moreover, such techniques are not just limited to images. Other forms of content, including video and audio, can be watermarked, and the metadata thereby associated with the content can be used for web indexing and other purposes.

Figure 1:
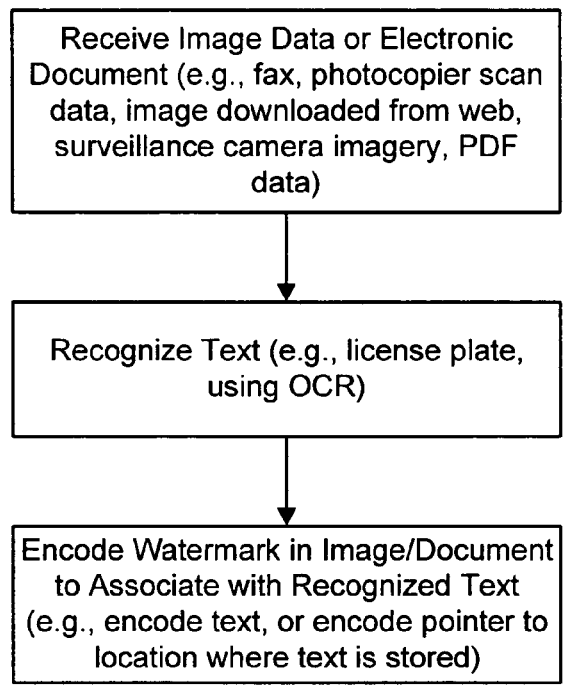
FIG. 1 illustrates methods according to certain embodiments of the present invention.
Figures 2, 3:
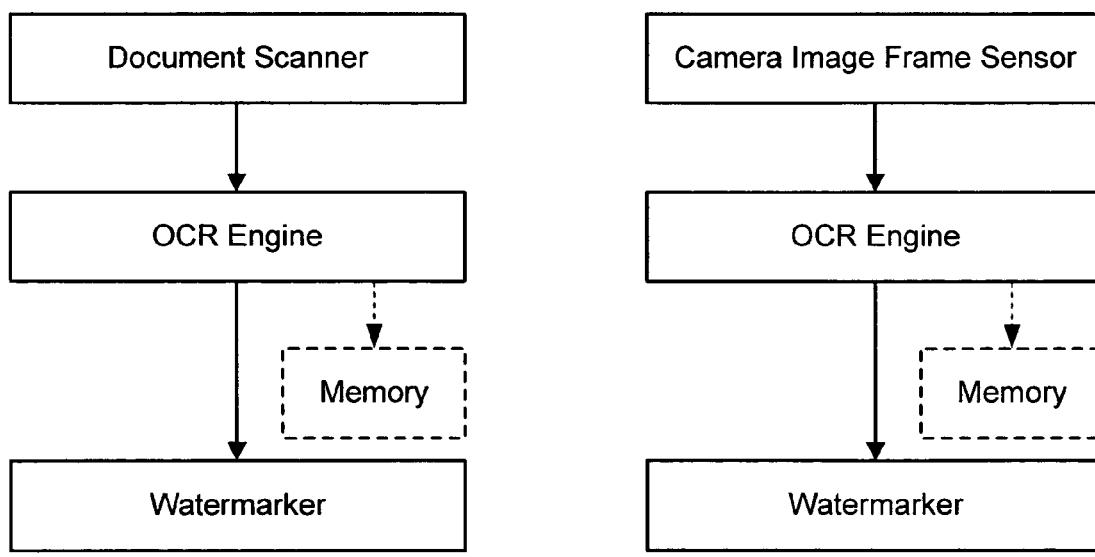
FIG. 2 illustrates a photocopier system according to one embodiment of the present invention.
FIG. 3 illustrates a video surveillance system according to one embodiment of the present invention.

The invention claimed is:

1. A method of augmenting image data collected by a security monitoring camera, comprising:
    analyzing a frame of image data from said security monitoring camera for text information depicted therein; and
    digitally watermarking said image data;
    wherein said digital watermark associates the image data with the text information.

2. The method of claim 1 wherein the frame of image data includes a depiction of a vehicle license plate, and said text information comprises text on said license plate.

3. The method of claim 1 that includes storing said text information in a data repository, and wherein said digital watermark indicates the location of the stored text information in said data repository.

4. The method of claim 1 in which said analyzing comprises performing an OCR process on said depicted text information.

5. The method of claim 1 wherein said digital watermark is essentially imperceptible to human viewers of image data collected by the security monitoring camera.

* * * * *

UNITED STATES PATENT AND TRADEMARK OFFICE
CERTIFICATE OF CORRECTION

PATENT NO. : 7,657,064 B1  Page 1 of 1
APPLICATION NO. : 09/670113
DATED : February 2, 2010
INVENTOR(S) : William Y. Conwell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1876 days.

Signed and Sealed this

Twelfth Day of October, 2010

David J. Kappos
*Director of the United States Patent and Trademark Office*